Sept. 9, 1924.   1,507,595
W. W. GOODE
ATTACHMENT FOR PLOWS
Filed Nov. 5, 1923   2 Sheets-Sheet 1
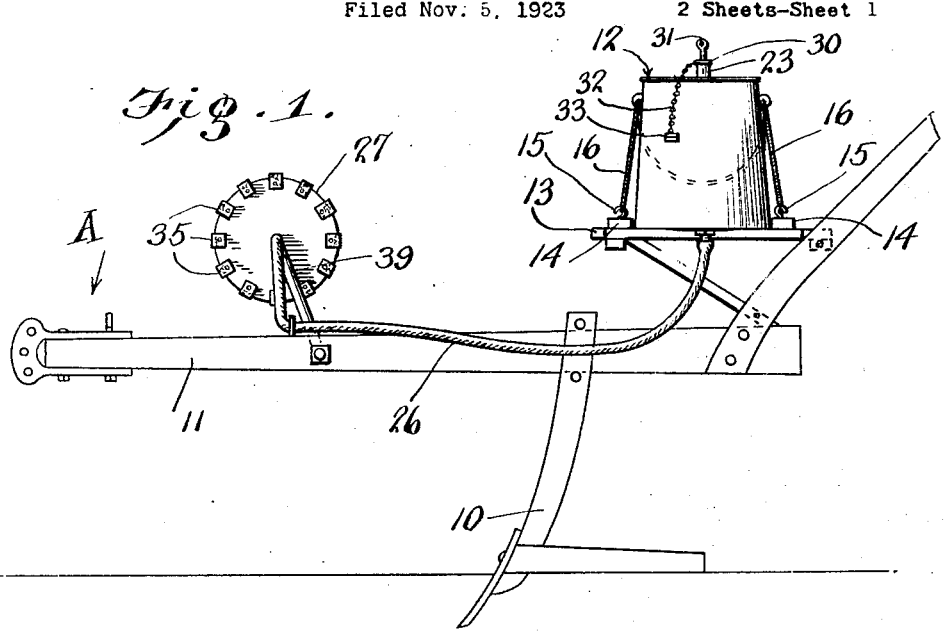
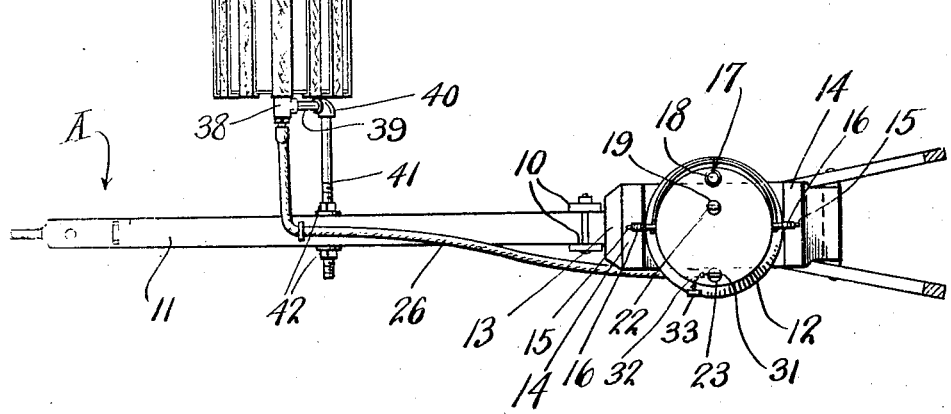
William W. Goode
INVENTOR
BY *Victor J. Evans*
ATTORNEY

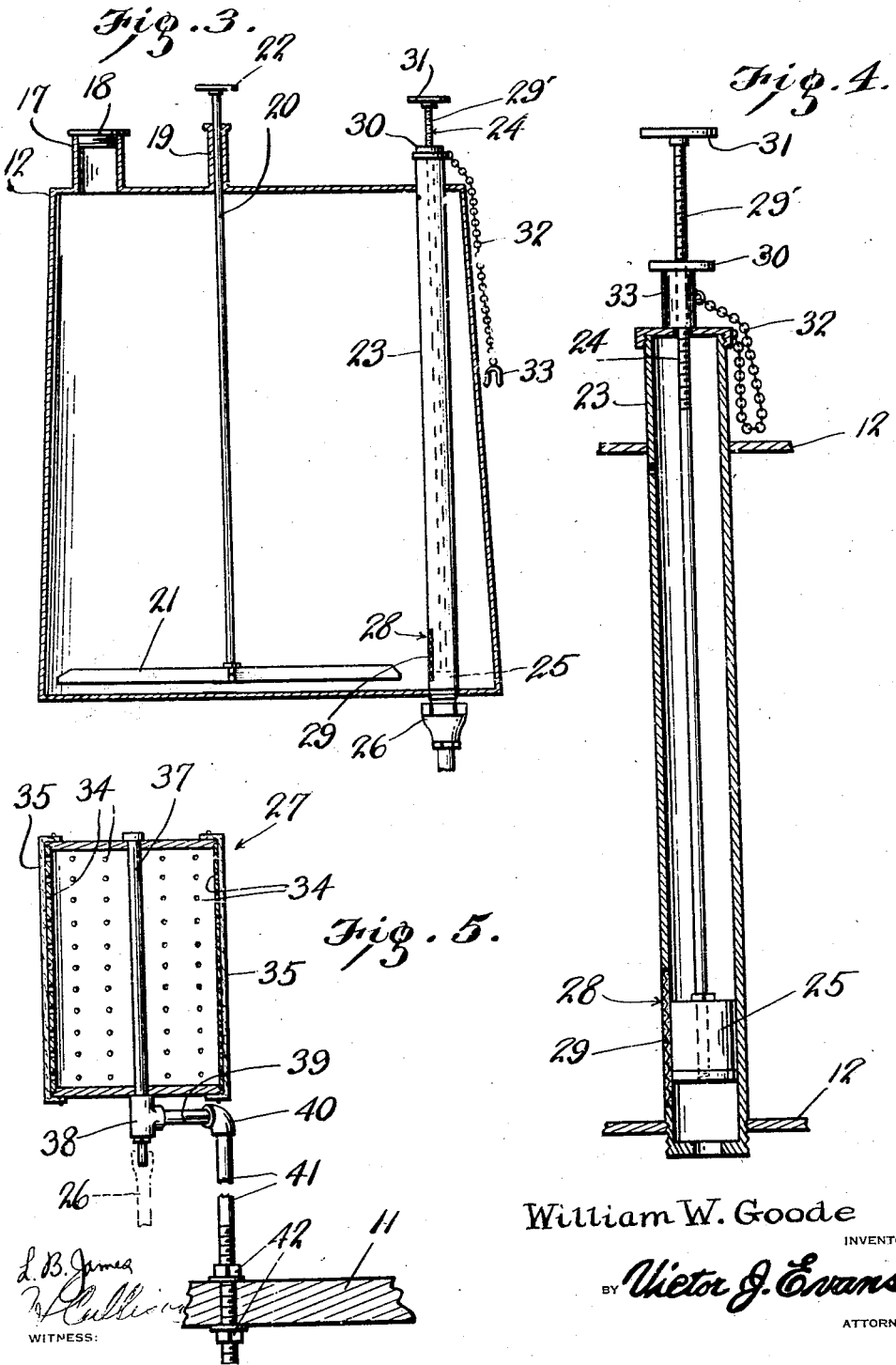

Patented Sept. 9, 1924.

1,507,595

UNITED STATES PATENT OFFICE.

WILLIAM W. GOODE, OF TUSKEGEE, ALABAMA.

ATTACHMENT FOR PLOWS.

Application filed November 5, 1923. Serial No. 672,961.

*To all whom it may concern:*

Be it known that I, WILLIAM W. GOODE, a citizen of the United States, residing at Tuskegee, in the county of Macon and State of Alabama, have invented new and useful Improvements in Attachments for Plows, of which the following is a specification.

This invention contemplates the provision of a plow attachment, in the nature of an apparatus designed to distribute poisonous matter to cotton plants for the destruction of boll weevil, while the plants are being cultivated, the invention residing in the construction, combination and arrangement of parts as claimed.

More specifically stated, the invention contemplates an apparatus of the above mentioned character, which can be arranged upon a common plow stock, and embodies amongst other features a container for the poisonous substance, which container has valve controlled communication with a distributing drum, the latter being of novel construction and adapted to brush the tops of the plants for the purpose of applying the poisonous substance thereto, the drum being arranged in advance of the plow so as to perform its function at the same time the plants are being cultivated.

Another object of the invention resides in the provision of means for arranging the distributing drum upon the plow stock so that the drum can be adjusted vertically and laterally for plants of different heights, and to position the distributing drum in proper relation to the plow stock as the occasion may require.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein:

Figure 1 is a view showing the application of the invention to the plow of ordinary well known construction.

Figure 2 is a top plan view.

Figure 3 is a vertical sectional view through the poison container.

Figure 4 is a vertical sectional view through the valve positioned within the container.

Figure 5 is an enlarged sectional view through the distributing drum and through the plow beam showing the connection between the latter and the supporting means for the drum.

Referring to the drawings in detail, A indicates generally a plow of well known construction, wherein the plow stock is indicated at 10 and the plow beam is represented at 11.

The apparatus forming the subject matter of the present invention embodies a container 12 adapted to receive a poisonous substance which is conveyed from the container 12 to a distributing drum for the application to the cotton plants for the purpose above mentioned. This container 12 can be constructed from any suitable material and vary in size and configuration without departing from the spirit of the invention. The container 12 reposes upon the platform 13, the latter being supported upon the plow stock and connected therewith in any suitable manner. Arranged transversely on the upper side of this platform 13 are spaced parallel cleats 14, each supporting a hook like element 15. Carried by the opposite sides of the container 12 are coiled springs 16, the upper ends of which are secured to the container, while the lower ends are adapted to be associated with the hook like elements 15, thus placing the springs under tension for the purpose of holding the container properly arranged upon the platform 13. The container is provided with a filling tube 17 normally closed by a removable stopper 18. A restricted neck 19 rises from the top of the container, and sliding through this neck is a reciprocatory rod 20, the latter supporting at its lower end an agitator 21, which when the rod is reciprocated stirs the contents of the container to prevent certain ingredients thereof from settling on the bottom. This operation is only necessary from time to time, to maintain the poisonous substance properly agitated and mixed. The rod 20 projects above the top of the container and is equipped with a suitable handle 22. Arranged vertically within the container 10 is a tubular casing or cylinder 23, the lower end of which is threaded into the bottom of the container, while the upper end projects a slight distance above the top of the container. Arranged within this casing 23 is a valve rod 24, the latter being equipped at its lower end with a tubular valve 25 which controls communication between the casing 23 and a supply pipe 26 which leads from the casing 23 to a distributing drum 27. The casing 23 is provided with an elongated inlet slot or opening 28 which is covered by a length of screen 29 so that the poisonous substance is strained before it passes from the container 10 into the casing 23. The upper end of the rod 24 is threaded as at 29' to accommodate an adjustable nut 30, while the upper end of this rod is also equipped with a handle 31. Carried by one end of a chain 32 secured to the casing 23, is a resilient clamp 33 which is adapted to embrace the upper end of a valve rod to form a stop for the adjusting nut 30, and thus holding the valve 25 in an adjusted or given position. By adjusting the valve 25 to different positions, the quantity of poisonous substance allowed to pass from the container 12 to the distributing drum can be easily regulated.

The distributing drum 27 is provided with spaced lines of perforations 34, each line extending from end to end of the drum, and covered by a strip of felt or other suitable absorbent material 35. The drum receives the poisonous substance from the container 12 through the supply pipe 26, the latter having one extremity coupled to one end of the drum 27 as shown. Consequently, as the plow is moved over the ground incident to the cultivation of the plants, the drum 27 which is arranged in advance of the plow and to one side of the plowbeam is brought into contact with the tops of the plants to supply the latter with poisonous substance for the destruction of boll weevil. By reason of the particular disposition of the distributing drum with relation to the plow proper, the punctured squares of cotton which have been affected by the boll weevil are knocked off the plants on the ground so that they can be subsequently covered by the plow. It is of course to be understood, that the drum 27 is mounted for rotation, and that the absorbent strips of material 35 are successively brought into contact with the plants incident to the application of the poisonous substance thereto. The drum is mounted upon a shaft 37, one end of which is associated with the adjacent end of the T-coupling 38, the opposite end of this coupling being connected with a supply pipe 26. Connected with the stem of this coupling is an upright pipe 39 which in turn is coupled by means of an elbow 40 with a threaded pipe 41 arranged horizontally and passed through a transverse opening in the plow beam 11. The pipe 41 is equipped with lock nuts 42 arranged at opposite sides of the beam 11, so that the drum is held in adjusted position with relation to the plow beam 11. However, it is manifest that by reason of this construction, the drum is susceptible of adjustment toward and away from the ground for plants of different heights and may also be laterally adjusted with relation to the plow beam as the occasion may require.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A plow attachment of the character described comprising a container adapted to receive a poisonous substance and supported by the plow stock, a manually operable agitator arranged within said container, a perforated distributing drum mounted for rotation upon the plow beam and arranged at one side thereof, said drum being susceptible of vertical and horizontal adjustment, a supply pipe establishing communication between the container and said drum, and a valve associated with the container and operable to control said communication.

2. A plow attachment comprising a container adapted to receive a poisonous substance, and supported by the plow stock, a distributing drum mounted for rotation and supported by and at one side of the plow beam, said drum having spaced parallel lines of perforations, a strip of absorbent material covering each line of perforations, a supply pipe establishing communication between the container and said drum, and a valve controlling said communication.

3. A plow attachment of the character described, comprising a platform adapted to be supported by the plow stock, a container reposing upon the platform, and adapted to receive a poisonous substance, means detachably connecting the container with the platform, a perforated distributing drum mounted for rotation and supported by and at one side of the plow beam, a tubular valve casing arranged within the container and having an elongated inlet slot, a screen covering said slot, a supply pipe coupled with the lower end of the valve casing, and with said drum, and a sliding valve operable within said tubular casing to regulate the flow of the substance from the container to the drum.

4. A plow attachment comprising a container adapted to be supported by the plow stock and to receive a quantity of poisonous substance, a perforated distributing drum, including a shaft, a threaded rod passed transversely through the plow beam and susceptible of both sliding and rotary movements with relation thereto, lock nuts supported by said rod at the opposite sides of said beam for holding the rod fixed with relation to the beam, a vertically disposed pipe coupled with one end of the rod, a T-coupling supported by the lower end of said pipe and having one end coupled with the shaft of said drum, a supply pipe leading from the container to said drum and associated with the adjacent end of the T-coupling, said pipe establishing communication between the container and said drum, and a valve controlling said communication.

In testimony whereof I affix my signature.

WILLIAM W. GOODE.